(12) United States Patent  (10) Patent No.:  US 7,040,600 B2
Lutzer  (45) Date of Patent:  May 9, 2006

(54) MECHANISM WITH A PUSH-PULL CABLE FOR OPERATING A VALVE IN AN AIRCRAFT

(75) Inventor: Wilhelm Lutzer, Zarpen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/757,765

(22) Filed: Jan. 14, 2004

(65) Prior Publication Data

US 2004/0164266 A1    Aug. 26, 2004

(30) Foreign Application Priority Data

Jan. 16, 2003   (DE) ................ 103 01 417

(51) Int. Cl.
    *F16K 31/44*   (2006.01)
    *F16K 31/00*   (2006.01)

(52) U.S. Cl. ............... 251/250; 251/284; 251/294

(58) Field of Classification Search ............ 251/229, 251/250, 284, 286, 288, 294
    See application file for complete search history.

(56) References Cited

U.S. PATENT DOCUMENTS

| 2,608,212 A | 8/1952 | Miller et al. |
| 2,631,469 A | 3/1953 | Oliner et al. |
| 2,738,804 A | 3/1956 | Ryan |
| 3,735,898 A * | 5/1973 | Smith .................. 222/129.4 |
| 4,597,556 A * | 7/1986 | Sandling ................ 251/58 |
| 6,032,924 A * | 3/2000 | Castle ................ 251/129.12 |

FOREIGN PATENT DOCUMENTS

| DE | 3120890 | 1/1983 |
| DE | 3928496 | 3/1991 |
| DE | 4009562 | 10/1991 |
| DE | 4439992 | 11/1995 |
| FR | 7507106 | 9/1976 |

* cited by examiner

*Primary Examiner*—Justine R. Yu
*Assistant Examiner*—Peter deVore
(74) *Attorney, Agent, or Firm*—W. F. Fasse; W. G. Fasse

(57) ABSTRACT

A valve, e.g. of an aircraft drinking water system, has a rotatable adjusting shaft to adjust the valve between its open end position and its closed end position. A mechanism for operating the adjusting shaft includes a push-pull cable connected to a toothed rack that engages a toothed gear element secured to the adjusting shaft. The mechanism converts the push-pull linear motion of the cable to a reciprocating rotational motion of the adjusting shaft. End sections of the rack and the gear element have no gear teeth, so the rack automatically disengages from the gear element once the end position of the valve is reached. The disengaged rack can slide beyond the stopped end position of the gear element, and re-engages with the gear element once it slides back into the operating range. The valve cannot be forced beyond its end positions, despite excessive input motion of the cable.

19 Claims, 3 Drawing Sheets

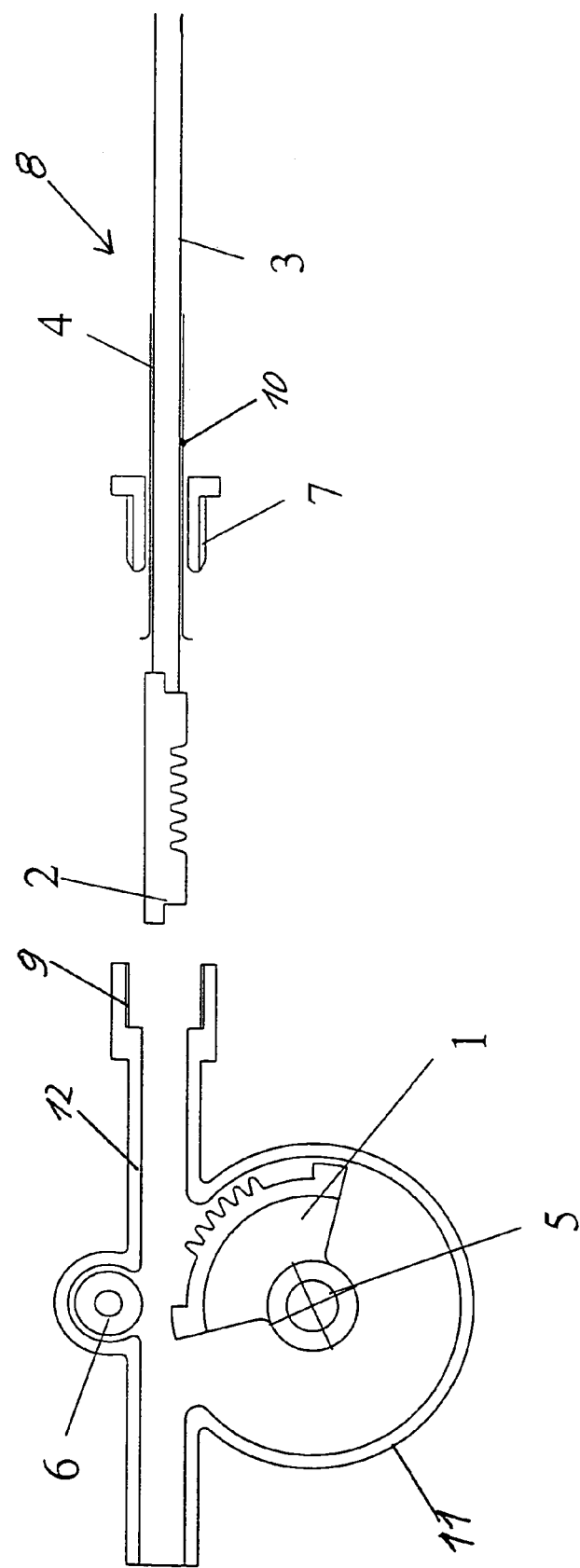

MECHANISM WITH A PUSH-PULL CABLE FOR OPERATING A VALVE IN AN AIRCRAFT

PRIORITY CLAIM

This application is based on and claims the priority under 35 U.S.C. §119 of German Patent Application 103 01 417.9, filed on Jan. 16, 2003, the entire disclosure of which is incorporated herein by reference.

FIELD OF THE INVENTION

The invention relates to a mechanism for operating a valve in an aircraft, and especially a valve for a drinking water system in a passenger aircraft, whereby the valve can be moved between an open position and a closed position by rotation of its adjusting shaft or lever.

BACKGROUND INFORMATION

It is well known in various applications to use valves for regulating the throughflow of flowable materials, for example liquids and particularly water. A commonly known valve structure has a rotatable adjusting shaft, lever or knob for selectively opening or closing the flow passage through the valve. In this context, it is possible to rotate the adjusting shaft, lever or knob so as to fully open the valve in an open end position, to fully close the valve in a closed end position, or to select any desired intermediate position for achieving a reduced intermediate liquid flow through the valve.

In an aircraft, and especially in connection with a valve of a drinking water system in a passenger aircraft, it is often not convenient to use a valve with such a rotatable adjusting shaft, lever or knob due to constraints of space or functionality. In this context, it has been found that a linear push-pull actuation would be more suitable or functional, but would not be directly compatible with the readily available rotationally adjustable valves.

SUMMARY OF THE INVENTION

In view of the above, it is an object of the invention to provide a mechanism by which a translational or linear push-pull motion can be used for operating a rotationally adjustable valve. It is a more particular object of the invention to provide a mechanism using a push-pull cable for operating the rotatable shaft or lever of a rotationally adjustable valve. The invention further has the object of allowing some play or imprecision of the operation of the push-pull cable while still ensuring precise adjustment of the valve to its respective end positions without forcing the valve beyond its end positions. The invention further aims to avoid or overcome the disadvantages of the prior art, and to achieve additional advantages, as apparent from the present specification. The attainment of these objects is, however, not a required limitation of the invention.

The above objects have been achieved according to the invention in a combination including a rotationally adjustable valve with a rotatable adjusting shaft, and an operating mechanism therefor, in an aircraft. The valve is especially or preferably a valve of a drinking water supply system in a passenger aircraft. By rotation of the adjusting shaft of the valve, the valve can be adjusted to its open end position or its closed end position or intermediate positions. The operating mechanism includes a toothed gear element which may be a circular gear wheel or a gear segment, and a toothed rod or rack. The toothed gear element is mechanically connected to the valve shaft for transmitting rotational motion thereto. For example, the gear element may be rigidly connected directly to the valve shaft on a common central rotation axis, or through a gear transmission, or via a connecting shaft. The toothed gear element cooperates with the toothed rack, such that a translational push-pull motion of the rack will be transmitted and converted into a rotational motion of the toothed gear element and thus of the valve adjusting shaft in order to rotationally adjust the valve. In this application, the terms "rotation", "rotational", "rotationally" and the like refer to any angular amount of rotation, e.g. including a reciprocating angular rotation or pivoting through an angular range of less than 360°.

According to a preferred feature of the invention, the operating mechanism further includes a counter pressure roller that rollingly contacts the side of the toothed rack opposite the toothed gear element, so as to hold the rack in engagement with the toothed gear element and prevent a slipping, stripping or jumping of the rack teeth of the rack relative to the gear teeth of the toothed gear element.

According to a further embodiment feature of the invention, a push-pull cable is connected to the operating mechanism, and particularly to the toothed rack, so that the translational push-pull motion of the cable can be converted to a rotational motion of the adjusting shaft of the valve via the operating mechanism. An advantage of the invention in this regard is that the conversion of the translational operating motion to the rotational operating motion does not require any adjusting forces to be exerted or applied through external structural components of the aircraft, the valve body, or the valve mounting arrangement.

Still further specific embodiments according to the invention comprise the following features. The toothed gear element and/or the toothed rack respectively have a specific limited number of gear or rack teeth distributed over a specific limited range or dimension in the respective operating direction thereof, to achieve exactly a prescribed adjusting angle range of the adjusting shaft of the valve. In this manner it is ensured that the valve can be adjusted exactly to its open and closed end positions as desired, without jamming or forcing the valve beyond its end positions. Furthermore, the rack and the toothed gear element can be configured with blank sections, e.g. un-notched or un-toothed protrusions or recesses, at both ends of the range of rack or gear teeth, so as to reversibly interrupt or release the form-locking engagement between the rack and the toothed gear element respectively for any linear motion of the rack beyond the two respective end positions of the gear element. Namely, in this manner the rack can continue to move beyond the end position of the gear element and the valve adjusting shaft, while the rack disengages from the gear element and thereafter undergoes an idling motion beyond the respective end position of the gear element. According to a further preferred feature, the rack and the gear element are configured and embodied in such a manner, so that a re-engagement of the respective teeth of the rack and the gear element is ensured when the rack is moved back into the normal operating range between the two end positions of the toothed gear element.

With the above features, the two end positions of the rotational motion of the toothed gear element and therewith the valve adjusting shaft can be exactly pre-specified by the structure of the arrangement, even though the translational motion of the push-pull cable in actual operation does not need to be exact, i.e. does not need to be exactly limited to the end positions of the rotational motion. Instead, the toothed rack will automatically disengage from the toothed gear element once the gear element reaches its respective rotational end position, whereupon the rack can continue its linear motion in an idle disengaged manner. Then, when the rack moves once again in the opposite direction, it will automatically and precisely re-engage with the toothed gear element once it reaches the proper re-engaging end position.

With this mechanism it is not necessary to adjust the control cable length after installation or replacement of the control cable. This is a considerable reduction in maintenance effort.

BRIEF DESCRIPTION OF THE DRAWINGS

In order that the invention may be clearly understood, it will now be described in connection with an example embodiment thereof, with reference to the accompanying drawings, wherein:

FIG. 7 shows the individual components of the mechanism according to FIG. 1 in a disassembled condition.

DETAILED DESCRIPTION OF PREFERRED EXAMPLE EMBODIMENTS AND THE BEST MODE OF THE INVENTION

Figure 1:
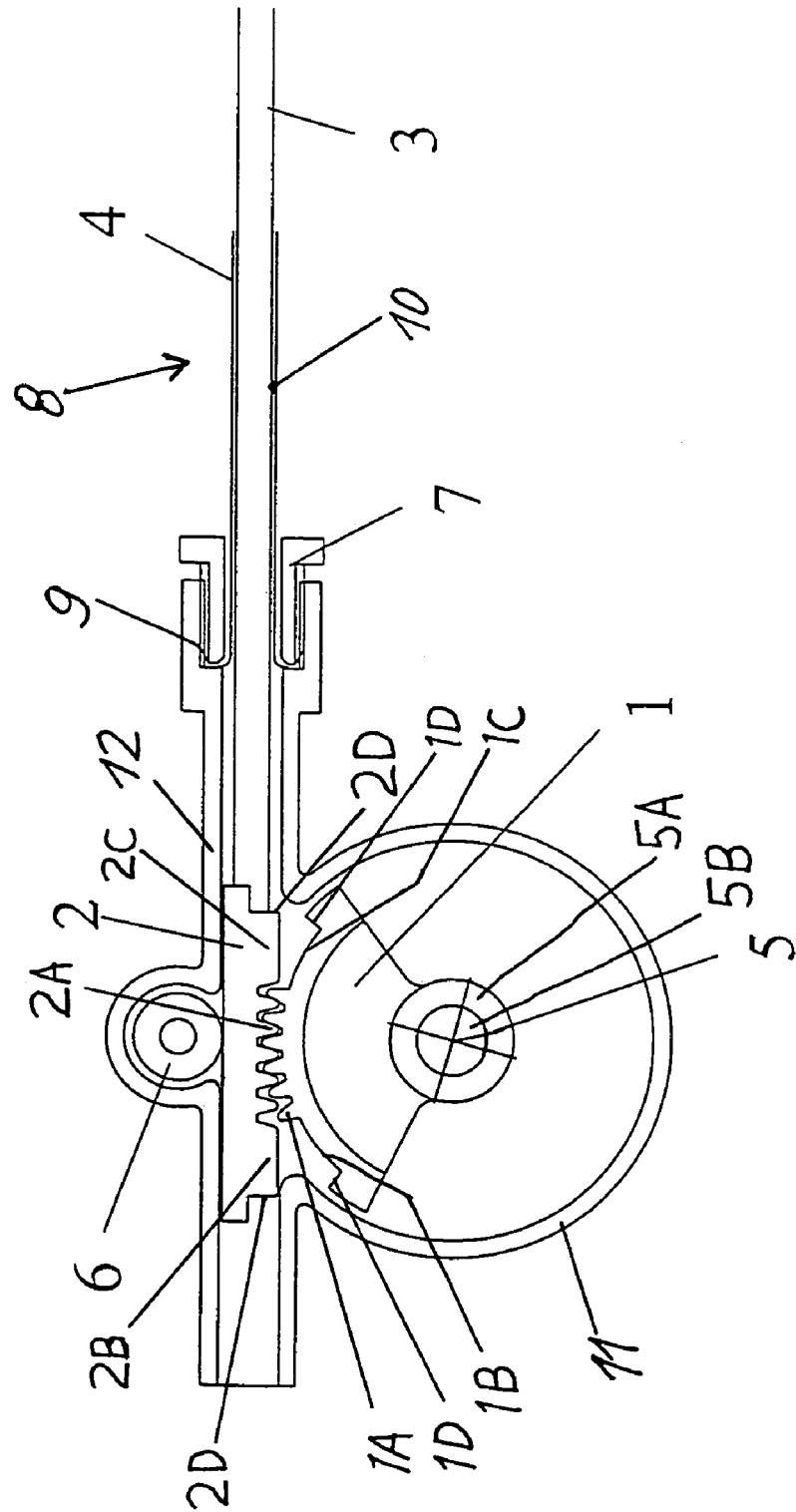
FIG. 1 is a schematic sectional or broken-open view of a mechanism for operating an aircraft water system valve using a push-pull cable, according to the invention.

FIGS. 1 and 7 respectively show an assembled condition and a disassembled condition of an arrangement or combination according to the invention, including a valve that is rotatably adjustable to open and close the valve, and an operating mechanism for operating the valve. The valve includes a rotatable adjusting shaft 5B that is to be pivotally rotated through a defined angular range for adjusting the valve selectively to its open end position, its closed end position, or any intermediate position therebetween. The details of the valve itself are not significant for the present invention, and can be embodied according to any conventionally known valve construction and operation. For this reason, and for simplicity in the drawings, the valve itself, except for the valve adjusting shaft 5B, is not illustrated.

The illustrated operating mechanism includes a generally cylindrical housing 11 and a generally tubular housing 12 that are joined together or integrally formed as a single unitary housing component. The mechanism further includes a toothed gear element 1, which may be a complete circular gear wheel or a gear segment extending circumferentially only over a limited angular range or circular segment. The toothed gear element 1 is received rotatably in the cylindrical housing 11, and is mounted with its gear hub 5A on the rotatable adjusting shaft 5B of the valve in a rigid or tightly secured manner, so that the gear element 1 and the valve adjusting shaft 5B share a common rotation axis 5. Thus, a rotational or pivoting motion of the gear element 1 will correspondingly cause a rotational or pivoting motion of the valve adjusting shaft 5B, to thereby adjust the valve into its closed end position or its open end position, or any intermediate position.

For operating, i.e. pivotally or rotationally moving, the gear element 1, the operating mechanism further includes a toothed rod or rack 2 that is linearly slidably or translationally received in the tubular housing 12. For operative cooperation between the rack 2 and the gear element 1, the rack 2 has rack teeth 2A that mate and engage with gear teeth 1A provided over a defined and limited angular range of the gear element 1. The two housing components 11 and 12 are arranged and/or configured relative to each other, so that the linear motion path of the rack 2 extends tangentially along the circumference of the gear element 1, with the respective rack teeth 2A and gear teeth 1A meshing and engaging with each other. Thereby, the translational or linear sliding motion of the rack 2 in the tubular housing 12 is converted into a rotational motion of the gear element 1 in the cylindrical housing 11. To further ensure and reliably maintain the proper engagement of the rack 2 with the gear element 1, a counter pressure roller 6 may be rotatably mounted in or on the housing 12 to press against the back or outer side of the rack 2 opposite the rack teeth 2A. Thereby, the counter pressure roller 6 presses and maintains the rack 2 firmly pressed and engaged against the gear element 1, to thereby reliably prevent a stripping or jumping-over by the rack teeth 2A relative to the gear teeth 1A.

The operating mechanism further includes a push-pull cable device 8 including an inner push-pull cable 3 supported and guided in an outer sheath 4. The inner cable 3 is connected to the right end of the rack 2 in any suitable mechanically secure manner. The outer sheath 4 of the cable device 8 is mechanically secured to an end of the tubular housing 12, for example preferably by screwing a threaded connector or collar 7 into a threaded inner bore or end 9 of the tubular housing 12. Thereby, for example, an end rim or flange of the outer sheath 4 is securely clamped between the threaded collar 7 and the threaded bore or end 9 of the tubular housing 12. The inner opening 10 of the sheath 4 provides a gliding or sliding guidance for the inner cable 3, which may, for example, be lubricated with grease or oil if required. This inner passage of the sheath 4 coaxially aligns with the threaded bore of the threaded end 9 of the housing 12. With this arrangement, a pulling or pushing motion applied to the inner cable 3 of the cable device 8 will correspondingly move the rack 2 toward the left or the right in FIG. 1. Thereby, the push-pull motion applied as an input to the cable 3 is converted to a rocking or reciprocating rotational motion of the valve adjusting shaft 5B via the rack 2 cooperating with the gear element 1.

Either the gear element 1 or the rack 2 or both include only a limited number of gear or rack teeth 1A or 2A respectively over an angular or linear range respectively related to the maximum rotational operating range of the valve, i.e. of the valve adjusting shaft 5B. Particularly, the angular range of the gear teeth 1A on the gear element 1 is essentially one-half of the angular rotational range of the valve shaft 5B between the two end positions of the valve, and the limited linear range of teeth 2A on the rack 2 corresponds essentially to the circumferential developed length of the angular range of the gear teeth 1A on the gear element 1. In the illustrated example, the angular range of the gear teeth 1A occupies about 45°, while the angular range of the valve adjustment between end positions thereof amounts to about 90°. Also in this context, the number of rack teeth 2A is one more, one less, or the same as the number of gear teeth 1A.

In the illustrated embodiment, the rack 2 has such a limited number of rack teeth 2A over a limited linear tooth range, and the gear element 1 has such a limited number of gear teeth 1A over a corresponding limited angular tooth range. On both sides of the tooth range, the rack 2 and the gear element 1 each have blank or idling sections that are not provided with teeth and that allow for the automatic disengagement of the rack 2 from the gear element 1 once the rotational motion of the gear element 1 has reached an end position of the valve shaft 5B, thereby allowing the linear motion of the rack 2 to continue beyond such an end position while it is disengaged from the gear element 1.

More specifically in this regard, on opposite sides or ends of the tooth range of the rack teeth 2A, the rack 2 includes rack end sections 2B and 2C that are blank un-toothed or un-grooved protruding sections, which respectively terminate at opposite facing ends in rack engaging abutments 2D. On the other hand, the gear element 1 includes gear end sections 1B and 1C, which are un-toothed recessed sections on opposite sides of the tooth range of the gear teeth 1A. The recessed blank gear end sections 1B and 1C respectively are bounded circumferentially by mutually inwardly facing gear engaging abutments 1D. The rack end sections 2B and 2C and the gear end sections 1B and 1C are configured, dimensioned and arranged to cooperate with each other to allow the selective idling disengagement of the rack 2 from the gear element 1, as will be discussed next. The recessed or protruding configuration of the end sections 1B, 1C versus 2B, 2C could be reversed.

The selective and repetitive engagement and disengagement of the rack 2 and the gear element 1 can be understood especially in connection with the FIGS. 2 to 6, which respectively show successive stages in the adjusting motion from one end position of the valve to the opposite end position of the valve, with the rack 2 moving successively toward the left in the sequence of FIGS. 2 to 6.

Figure 2:
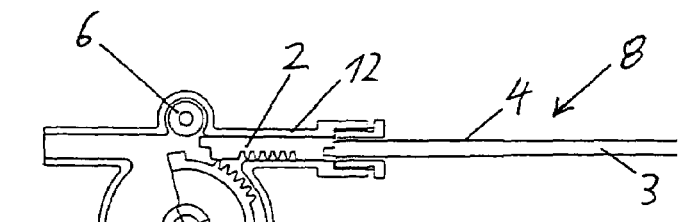
FIG. 2 shows the mechanism according to FIG. 1 in an operating condition wherein the push-pull cable and the toothed rack extend beyond a first end position of the toothed gear element.

In FIG. 2, the gear element 1 is rotated maximally clockwise so that the valve is in one of its end positions, e.g. the closed valve position. The rack 2 has moved linearly to its maximum end position toward the right, and is disengaged from the gear element 1. Namely, as can be seen in FIG. 2, the rack teeth 2A have disengaged from the gear teeth 1A, and the un-toothed rack end section 2B has slid out of the gear end section 1B.

Figure 3:
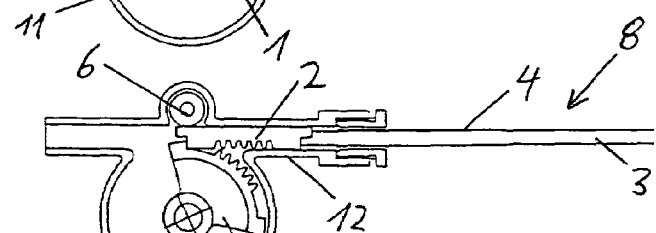
FIG. 3 shows the mechanism according to FIG. 1 exactly at the first end position wherein the toothed rack re-engages with the toothed gear element while moving toward the left.

In the transition from FIG. 2 to FIG. 3, the rack 2 is moving linearly toward the left while the gear element 1 remains stationary in the closed end position of the valve. At the point shown in FIG. 3, the rack engaging abutment 2D of the rack 2 has just contacted the gear engaging abutment 1D of the gear element 1, while the rack end section 2B comes into engaging position within the gear end section 1B. Thus, any further linear motion of the rack 2 toward the left will now begin rotating the gear element 1 toward the left.

Figure 4:
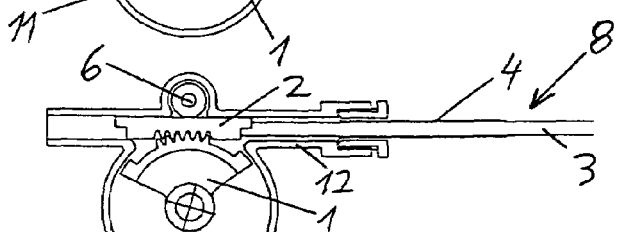
FIG. 4 shows the mechanism according to FIG. 1 in a centered position, in which the leftward translational motion of the rack is converted into a counterclockwise rotational motion of the gear element.

That has occurred in the transition from FIG. 3 to FIG. 4, whereupon now the rack teeth 2A have come into full engagement with the gear teeth 1A. In this range, the gear element 1 is rotated toward the left, while correspondingly rotating the valve adjusting shaft 5B counterclockwise through intermediate positions between the closed end position and the opposite open end position of the valve.

Figure 5:
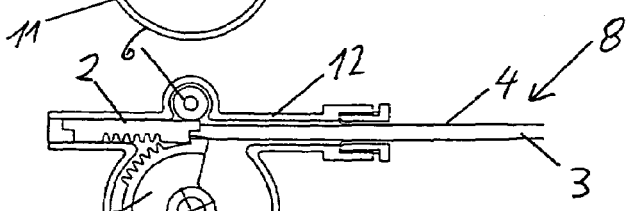
FIG. 5 shows the mechanism according to FIG. 1 exactly in the second end position, wherein the rack, in its motion toward the left, is disengaging from the toothed gear element.

In FIG. 5, the rack 2 has moved farther toward the left until the gear element 1 has been rotated to the open end position of the valve. Exactly at this point, the rack teeth 2A have come out of engagement with the gear teeth 1A, so that the gear element 1 stops at the rotational end position of the valve, while the rack 2 may continue to move linearly toward the left.

Figure 6:
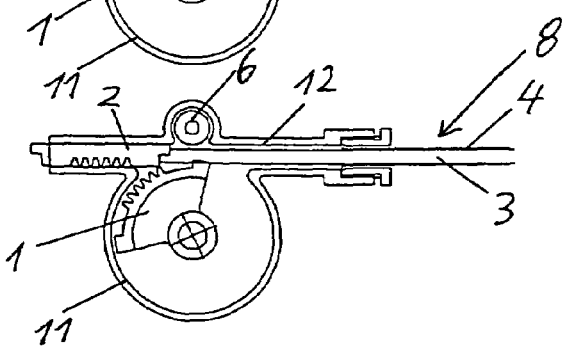
FIG. 6 shows the mechanism according to FIG. 1 in a further position in which the rack is disengaged and has moved toward the left beyond the second end position of the toothed gear element.

FIG. 6 shows the position with the rack 2 having moved farther toward the left to its leftmost end position, whereby the rack end section 2C has come out of the gear end section 1C to allow the free disengaged idling motion of the rack 2 without further motion of the gear element 1.

The operating sequence of the stages of FIGS. 2 to 6 can simply be reversed to adjust the valve from the open position to the closed position. The operation is substantially the same in both directions. For example, progressing from FIG. 6 to FIG. 5, the rack engaging abutment 2D on the right end of the rack 2 will abut against the associated gear engaging abutment 1D of the gear element 1, which positively brings the rack 2 back into proper meshing engagement with the gear element 1.

In the above manner, it is ensured that the rack 2 can be smoothly and automatically disengaged from the gear element 1 each time that the gear element 1 reaches a rotational end position of the valve, while allowing the rack 2 to continue moving in a disengaged idling manner beyond the end position of the gear element 1. Also ensured is the proper and positive re-engagement of the rack 2 once it is moved back into the operating motion range of the gear element 1. This in turn ensures precise operation of the valve adjusting shaft without requiring precise operation of the push-pull cable device 8 connected to and driving the rack 2. It is further ensured that the valve will not be forced beyond its proper open and closed end positions through the application of an excessive operating force, because the operating mechanism automatically disengages exactly at the point at which the valve reaches its open or closed end position.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A combination in an aircraft comprising:

a valve having a rotatable adjusting shaft, by rotation of which said valve is adjustable selectively between an open end position and a closed end position; and an operating mechanism including a toothed gear element and a toothed rack cooperating with said toothed gear element;

wherein said toothed gear element includes gear teeth, is rotatable, and is mechanically connected to said adjusting shaft of said valve so as to transmit a rotating motion of said toothed gear element to said adjusting shaft;

wherein said toothed rack includes rack teeth engaging said gear teeth so as to convert and transmit a linear motion of said toothed rack to said rotating motion of said toothed gear element; and wherein said toothed rack and said toothed gear element are respectively configured and arranged so that said rotating motion of said toothed gear element is angularly limited to a limited angular range between said open end position and said closed end position of said valve, said rack teeth engage said gear teeth only over a limited linear range of said linear motion of said toothed rack corresponding to a circumferential developed length of said limited angular range of said rotating motion of said toothed gear element, and said engaging of said rack teeth with said gear teeth can be reversibly interrupted as said linear motion of said toothed rack continues in either direction past said limited linear range.

2. The combination according to claim 1, wherein said toothed gear element is mechanically connected directly rigidly to said adjusting shaft of said valve, and wherein said toothed gear element and said adjusting shaft share a single common rotation axis.

3. The combination according to claim 1, wherein said valve is a valve of a drinking water supply system of said aircraft which is a passenger transport aircraft.

4. The combination according to claim 1, wherein said operating mechanism further includes a push-pull cable device comprising an inner push-pull cable slidably arranged in an outer sheath, wherein said inner push-pull cable is connected to said toothed rack so that said toothed rack and said inner push-pull cable both undergo said linear motion together.

5. The combination according to claim 1, wherein said operating mechanism further includes a counter pressure roller that is rotatably arranged on a side of said toothed rack opposite said toothed gear element and applies pressure to said toothed rack toward said toothed gear element so as to hold said rack teeth in positive engagement with said gear teeth.

6. The combination according to claim 1, wherein said toothed gear element includes only a limited number of said gear teeth distributed over a limited angular gear range corresponding to one-half of a valve adjustment angular range of a maximum angular rotation of said adjusting shaft limited to said limited angular range between said open end position and said closed end position of said valve.

7. The combination according to claim 6, wherein said toothed rack includes only a limited number of said rack teeth suitable for engagement with said limited number of said gear teeth, distributed over a limited linear rack range corresponding to a circumferential developed length of said limited angular gear range of said toothed gear element.

8. The combination according to claim 7, wherein said toothed gear element further includes respective blank gear sections without gear teeth on opposite sides of and adjoining said limited angular gear range, said toothed rack further includes respective blank rack sections without rack teeth on opposite sides of and adjoining said limited linear rack range, and said blank gear sections allow said blank rack sections to disengage therefrom so that said linear motion of said toothed rack can continue disengaged from said rotating motion of said toothed gear element beyond respective points at which said adjusting shaft has been rotated to said open end position or said closed end position of said valve.

9. The combination according to claim 8, wherein said blank gear sections are respective recessed sections having a recessed floor at a depth of gear grooves provided between said gear teeth, and said blank rack sections are respective protruding sections having an un-grooved un-toothed protrusion surface at a height of said rack teeth.

10. The combination according to claim 8, wherein said toothed gear element further includes respective gear abutments on opposite sides of and bounding said blank gear sections, said toothed rack further includes respective rack abutments on opposite sides of and bounding said blank rack sections, and said gear abutments and said rack abutments are configured, arranged and adapted respectively to contact one another to re-establish an engagement of said toothed rack with said toothed gear element when said toothed rack is moved back into said limited linear range corresponding to a center partial range of said linear motion of said toothed rack.

11. The combination according to claim 1, wherein said toothed rack includes only a limited number of said rack teeth distributed over a limited linear rack range suitable for achieving said limited angular range of said rotating motion between said open end position and said closed end position of said valve.

12. The combination according to claim 1, wherein said toothed rack and said toothed gear element are configured and arranged so that a re-engagement of said rack teeth with said gear teeth is ensured once said toothed rack moves back into said limited linear range.

13. A combination comprising:
a valve having a rotatable adjusting shaft, by rotation of which said valve is adjustable selectively between an open end position and a closed end position; and
an operating mechanism including a toothed gear element and a toothed rack cooperating with said toothed gear element;
wherein said toothed gear element includes gear teeth, is rotatable, and is mechanically connected to said adjusting shaft of said valve so as to transmit a rotating motion of said toothed gear element to said adjusting shaft;
wherein said toothed rack includes rack teeth engaging said gear teeth so as to convert and transmit a linear motion of said toothed rack to said rotating motion of said toothed gear element;
wherein said toothed gear element includes only a limited number of said gear teeth distributed over a limited angular gear range;
wherein said toothed rack includes only a limited number of said rack teeth suitable for engagement with said limited number of said gear teeth, distributed over a limited linear rack range; and
wherein said toothed gear element further includes respective blank gear sections without gear teeth on opposite sides of and adjoining said limited angular gear range, said toothed rack further includes respective blank rack sections without rack teeth on opposite sides of and adjoining said limited linear rack range, and said blank gear sections allow said blank rack sections to disengage therefrom so that said linear motion of said toothed rack can continue disengaged from said rotating motion of said toothed gear element beyond respective points at which said adjusting shaft has been rotated to said open end position or said closed end position of said valve.

14. The combination according to claim 13, wherein said blank gear sections are respective recessed sections having a recessed floor at a depth of gear grooves provided between said gear teeth, and said blank rack sections are respective protruding sections having an un-grooved un-toothed protrusion surface at a height of said rack teeth.

15. The combination according to claim 13, wherein said toothed gear element further includes respective gear abutments on opposite sides of and bounding said blank gear sections, said toothed rack further includes respective rack abutments on opposite sides of and bounding said blank rack sections, and said gear abutments and said rack abutments are configured, arranged and adapted respectively to contact one another to re-establish an engagement of said toothed rack with said toothed gear element when said toothed rack is moved back into a center partial range of said linear motion of said toothed rack corresponding to a maximum range of said rotating motion of said toothed gear element.

16. A combination comprising:
   a valve having a rotatable adjusting shaft, by rotation of which said valve is adjustable selectively between an open end position and a closed end position; and
   an operating mechanism including a toothed gear element and a toothed rack cooperating with said toothed gear element;
   wherein said toothed gear element includes gear teeth, is rotatable, and is mechanically connected to said adjusting shaft of said valve so as to transmit a rotating motion of said toothed gear element to said adjusting shaft;
   wherein said toothed rack includes rack teeth engaging said gear teeth so as to convert and transmit a linear motion of said toothed rack to said rotating motion of said toothed gear element; and
   wherein said operating mechanism further includes means for selectively disengaging said toothed rack from said toothed gear element for allowing said linear motion of said toothed rack to continue disengaged from said rotating motion of said toothed gear element beyond respective angular stopping points of said toothed gear element corresponding to said open and closed end positions of said valve.

17. A combination in an aircraft comprising:
   a valve having a rotatable adjusting shaft, by rotation of which said valve is adjustable selectively between an open end position and a closed end position; and
   an operating mechanism including a toothed gear element and a toothed rack cooperating with said toothed gear element;
   wherein said toothed gear element is rotatable, is mechanically connected to said adjusting shaft of said valve so as to transmit a rotating motion of said toothed gear element to said adjusting shaft, and includes only a limited number of gear teeth distributed over a limited angular gear range corresponding to one-half of a valve adjustment angular range of a maximum angular rotation of said adjusting shaft between said open end position and said closed end position of said valve;
   wherein said toothed rack includes only a limited number of rack teeth for engagement with said limited number of said gear teeth so as to convert and transmit a linear motion of said toothed rack to said rotating motion of said toothed gear element, wherein said rack teeth are distributed over a limited linear rack range corresponding to a circumferential developed length of said limited angular gear range of said toothed gear element; and
   wherein said toothed gear element further includes respective blank gear sections without gear teeth on opposite sides of and adjoining said limited angular gear range, said toothed rack further includes respective blank rack sections without rack teeth on opposite sides of and adjoining said limited linear rack range, and said blank gear sections allow said blank rack sections to disengage therefrom so that said linear motion of said toothed rack can continue disengaged from said rotating motion of said toothed gear element beyond respective points at which said adjusting shaft has been rotated to said open end position or said closed end position of said valve.

18. The combination according to claim 17, wherein said blank gear sections are respective recessed sections having a recessed floor at a depth of gear grooves provided between said gear teeth, and said blank rack sections are respective protruding sections having an un-grooved un-toothed protrusion surface at a height of said rack teeth.

19. The combination according to claim 17, wherein said toothed gear element further includes respective gear abutments on opposite sides of and bounding said blank gear sections, said toothed rack further includes respective rack abutments on opposite sides of and bounding said blank rack sections, and said gear abutments and said rack abutments are configured, arranged and adapted respectively to contact one another to re-establish an engagement of said toothed rack with said toothed gear element when said toothed rack is moved back into a center partial range of said linear motion of said toothed rack corresponding to a maximum range of said rotating motion of said toothed gear element.

* * * * *